US012675327B2

(12) United States Patent
Liu et al.

(10) Patent No.: US 12,675,327 B2
(45) Date of Patent: Jul. 7, 2026

(54) DATA LABELING SYSTEM AND METHOD, AND DATA LABELING MANAGER

(71) Applicant: Yinwang Intelligent Technologies Co., Ltd., Shenzhen (CN)

(72) Inventors: Xinchun Liu, Hangzhou (CN); Jian Wang, Shenzhen (CN)

(73) Assignee: Yinwang Intelligent Technologies Co., Ltd., Shenzhen (CN)

(*) Notice: Subject to any disclaimer, the term of this patent is extended or adjusted under 35 U.S.C. 154(b) by 570 days.

(21) Appl. No.: 17/975,971

(22) Filed: Oct. 28, 2022

(65) Prior Publication Data

US 2023/0048473 A1 Feb. 16, 2023

Related U.S. Application Data

(63) Continuation of application No. PCT/CN2020/088395, filed on Apr. 30, 2020.

(51) Int. Cl.
*G06F 9/50* (2006.01)

(52) U.S. Cl.
CPC ................................. *G06F 9/5027* (2013.01)

(58) Field of Classification Search
CPC ...... G06F 9/5027; G06F 16/285; G06F 16/22; G06N 3/0464; G06N 3/09; G06N 3/0985;

(Continued)

(56) References Cited

U.S. PATENT DOCUMENTS 7,788,575 B2 8/2010 Carlson et al.
8,521,664 B1 8/2013 Lin et al.
(Continued)

FOREIGN PATENT DOCUMENTS

CA 3091405 A1 6/2019
CN 108985293 A 12/2018
(Continued)

OTHER PUBLICATIONS

Yang, "An Elastic Cloud Computing Algorithm of Floating Car Data Based on Virtualized Managed Framework," Modern Computer, Jan. 2014, 6 pages (with English abstract).
(Continued)

*Primary Examiner* — Adam Lee
(74) *Attorney, Agent, or Firm* — Fish & Richardson P.C.

(57) ABSTRACT

Embodiments of this application disclose a data labeling system and method, and a data labeling manager. An example system includes a data labeling manager, a labeling model storage repository, and a basic computing unit storage repository. The data labeling manager receives a data labeling request, obtains a target basic computing unit, allocates a hardware resource to the target basic computing unit, establishes a target computing unit, obtains first storage path information of basic parameter data of a first labeling model, and sends the first storage path information to the target computing unit. The target computing unit obtains the basic parameter data of the to-be-used labeling model by using the first storage path information, combines a target model inference framework and the basic parameter data of the first labeling model to obtain the first labeling model, and labels to-be-labeled data by using the first labeling model.

24 Claims, 5 Drawing Sheets

(58) Field of Classification Search
CPC .......... G06N 3/063; G06N 3/098; G06N 3/08;
G06N 5/04; G06N 20/00
USPC ........................................................ 718/104
See application file for complete search history.

(56) References Cited

U.S. PATENT DOCUMENTS

| | | | |
|---|---|---|---|
| 2007/0112793 | A1 | 5/2007 | Florescu et al. |
| 2017/0308810 | A1 | 10/2017 | Chen et al. |
| 2018/0114098 | A1 | 4/2018 | Desai et al. |
| 2019/0147286 | A1 | 5/2019 | Marks |
| 2019/0272443 | A1 | 9/2019 | Goenka et al. |
| 2021/0224684 | A1* | 7/2021 | Sarkar ................... G06F 16/907 |
| 2021/0232966 | A1* | 7/2021 | Elisha .................... G06Q 10/10 |
| 2021/0248511 | A1* | 8/2021 | Nadimpalli ............. G10L 15/22 |
| 2021/0326720 | A1* | 10/2021 | Riemenschneider .. G06N 3/042 |

FOREIGN PATENT DOCUMENTS

| | | | |
|---|---|---|---|
| CN | 109376868 | A | 2/2019 |
| CN | 109840591 | A | 6/2019 |
| CN | 110135522 | A | 8/2019 |
| CN | 110147547 | A | 8/2019 |
| CN | 110163269 | A | 8/2019 |
| CN | 110209574 | A | 9/2019 |
| CN | 110210624 | A | 9/2019 |
| CN | 110321450 | A | 10/2019 |
| CN | 110674295 | A | 1/2020 |
| CN | 110825914 | A | 2/2020 |
| CN | 110929119 | A | 3/2020 |
| CN | 112740230 | A | 4/2021 |
| JP | 2017524183 | A | 8/2017 |
| WO | 2019109771 | A1 | 6/2019 |

OTHER PUBLICATIONS

Extended European Search Report in European Appln No. 20934205.4, dated May 3, 2023, 7 pages.
International Search Report and Written Opinion in International Appln. No. PCT/CN2020/088395, mailed on Jan. 11, 2021, 19 pages (with English translation).
AWS, "Developer Guide Amazon Machine Learning," Aug. 2, 2016, retrieved from URL <https://docs.aws.amazon.com/pdfs/machine-learning/latest/dg/machinelearning-dg.pdf>, 202 pages.
Office Action in Japanese Appln. No. 2022-566434, mailed on Nov. 20, 2023, 11 pages (with English translation).
Nauata, "Structured Label Interference for Visual Understanding," Thesis for the degree of Master of Science, University of Campinas, Department of Computing Sciences, Apr. 18, 2018, 48 pages.
An et al., "Research on Character-Level Feature Extraction Scheme in Sequence Labeling Models," Library and Information Work, Jun. 2018, 62(11): 18 pages (with English translation).

* cited by examiner

Client

Client

Client

Data labeling
system

Labeling model storage repository

Data labeling system

DATA LABELING SYSTEM AND METHOD, AND DATA LABELING MANAGER

CROSS-REFERENCE TO RELATED APPLICATIONS

This application is a continuation of International Application No. PCT/CN2020/088395, filed on Apr. 30, 2020, the disclosure of which is hereby incorporated by reference in its entirety.

TECHNICAL FIELD

This application relates to the field of machine learning technologies, and in particular, to a data labeling system and method, and a data labeling manager.

BACKGROUND

A machine learning model can be used only after model establishment and model training are performed. During the model training, a large amount of sample data usually needs to be collected, the sample data is labeled, and each piece of sample data and a corresponding labeling result are used as a group of training samples to train an established model. It can be learned that sample labeling is necessary in the model training.

Currently, a user who has a labeling requirement may upload data that needs to be labeled to a data labeling system, and then the data labeling system may use an integrated labeling model to label the data uploaded by the user. For the labeling model in the data labeling system, a skilled person usually integrates a labeling model obtained after training into the data labeling system through hard coding.

In a process of implementing this application, the inventors find that the conventional technology has at least the following problems:

A current labeling model can only be integrated into a data labeling system by a skilled person through hard coding, and sample data cannot be labeled by using a labeling model of a user. In a current data labeling system, the user cannot use the labeling model of the user to label the sample data. It can be learned that, the current data labeling system has relatively poor flexibility and only the labeling model integrated by the skilled person can be used.

SUMMARY

Embodiments of this application provide a data labeling system and method, and a data labeling manager, to resolve problems in a related technology that a data labeling system has poor flexibility and only a labeling model integrated by a skilled person can be used. The technical solution is as follows:

According to a first aspect, a data labeling system is provided. The data labeling system includes a data labeling manager, a labeling model storage repository, and a basic computing unit storage repository.

The data labeling manager is configured to: receive a data labeling request sent by a client, where the data labeling request carries a model identifier of a first labeling model and hardware resource allocation information; obtain a target basic computing unit from the basic computing unit storage repository, where the target basic computing unit includes a target model inference framework and a hardware driver invocation tool that correspond to the first labeling model; based on the hardware resource allocation information, allocate a hardware resource to the target basic computing unit, and establish a target computing unit; and obtain, from a stored correspondence between a model identifier and storage path information of basic parameter data, first storage path information that is of basic parameter data which corresponds to the model identifier of the first labeling model, and send the first storage path information to the target computing unit.

The target computing unit is configured to: obtain basic parameter data of the to-be-used labeling model from the labeling model storage repository by using the first storage path information, where the basic parameter data of the first labeling model includes a value obtained after a trainable parameter in the first labeling model is trained; combine the target model inference framework and the basic parameter data of the first labeling model, to obtain the first labeling model; obtain to-be-labeled data; and input the to-be-labeled data into the first labeling model, and label the to-be-labeled data.

In the solution shown in the embodiments of this application, the data labeling system may be implemented on a single server. For example, the data labeling manager is a functional module on the single server, and the labeling model storage repository and the basic computing unit storage repository are storage areas on the single server. Certainly, the data labeling system may alternatively be a server cluster, and the data labeling manager, the labeling model storage repository, and the basic computing unit storage repository may be separately deployed on different servers in the server cluster.

The basic computing unit may be a program including a model inference framework, a hardware driver invocation tool, and an environment file supporting language running. The model inference framework may be a convolutional architecture for fast feature embedding (convolutional architecture for fast feature embedding, Caffe), Tensorflow, PyTorch, or the like. These model inference frameworks may be stored by a skilled person in the basic computing unit storage repository of the data labeling system. A user may further select a hardware resource used during labeling, for example, the user may specify a quantity of central processing units (central processing units, CPUs), a quantity of graphics processing units (graphics processing units), or the like. In other words, the user can specify a hardware resource based on an actual requirement, instead of a hardware resource already allocated by the data labeling system. In this way, a user requirement can be better met.

When the user has a labeling requirement, the data labeling manager in the data labeling system may select the basic computing unit including the target model inference framework, and allocate the hardware resource to the basic computing unit, to construct the target computing unit.

Then, the target computing unit may obtain the basic parameter data of the first labeling model, combine the basic parameter data of the first labeling model and the target model inference framework, to obtain the first labeling model, and then label the to-be-labeled data by using the first labeling model. It can be learned that, in the solution shown in the embodiments of this application, a labeling model does not need to be integrated into the data labeling system through hard coding, so that the data labeling system is more flexible, and more labeling models are available.

In a possible implementation, the data labeling manager is further configured to: receive the model identifier and the basic parameter data that are of the first labeling model and that are sent by the client; and store the basic parameter data of the first labeling model in the labeling model storage repository, and correspondingly store the model identifier of the first labeling model and the first storage path information of the basic parameter data of the first labeling model.

In the solution shown in the embodiments of this application, the user uploads the basic parameter data of the first labeling model to the data labeling system. The data labeling manager in the data labeling system may receive the basic parameter data that is of the first labeling model and that is uploaded by the user, store the basic parameter data that is of the first labeling model and that is uploaded by the user in the labeling model storage repository of the data labeling system, and correspondingly store the model identifier of the first labeling model and the first storage path information of the basic parameter data of the first labeling model.

When labeling the to-be-labeled data subsequently, the user may select the basic parameter data that is of the first labeling model and that is uploaded by the user, and combine the basic parameter data that is of the first labeling model and that is uploaded by the user and the target model inference framework provided by the data labeling system, to generate the first labeling model.

In a possible implementation, the data labeling request further carries a data identifier of the to-be-labeled data, and the data labeling manager is further configured to:

obtain, from a stored correspondence between a data identifier and storage path information of data, second storage path information corresponding to the data identifier of the to-be-labeled data; and send the second storage path information to the target computing unit; and the target computing unit is configured to:

obtain the to-be-labeled data by using the second storage path information.

In a possible implementation, the data labeling request further carries a framework identifier of the target model inference framework, and the data labeling manager is configured to:

obtain, from the basic computing unit storage repository based on the framework identifier of the target model inference framework, the target basic computing unit including the target model inference framework.

In the solution shown in the embodiments of this application, when the user uploads basic parameter data of a labeling model, the user may further select a model inference framework that needs to be used. After receiving the data labeling request, the data labeling manager in the data labeling system selects, based on the frame identifier that is of the target model inference framework and that is carried in the data labeling request, the target basic computing unit including the target model inference framework.

In a possible implementation, the data labeling manager is further configured to:

in a process in which the target computing unit labels the to-be-labeled data by using the first labeling model, receive a labeling model replacement request sent by the client, where the labeling model replacement request carries a model identifier of a second labeling model; obtain, from a stored correspondence between a model identifier and storage path information of basic parameter data, third storage path information that is of basic parameter data which corresponds to the model identifier of the second labeling model; and send a model replacement instruction to the target computing unit, where the model replacement instruction carries the third storage path information; and the target computing unit is configured to: stop labeling to-be-labeled data that has not been labeled; obtain basic parameter data of the second labeling model in the labeling model storage repository by using the third storage path information; replace the basic parameter data that is of the first labeling model and that is in the target model inference framework with the basic parameter data of the second labeling model, to obtain the second labeling model, where the second labeling model and the first labeling model correspond to a same model inference framework; and input the to-be-labeled data that has not been labeled into the second labeling model, and label the to-be-labeled data that has not been labeled.

In the solution shown in the embodiments of this application, in a process of labeling the to-be-labeled data, the user may select to change the labeling model, and label the to-be-labeled data that has not been labeled. For example, after labeling the to-be-labeled data by using the first labeling model for 10 minutes, the user needs to label the to-be-labeled data that has not been labeled by using the second labeling model. In this case, the user may send a labeling model replacement request to the data labeling system. The data labeling manager in the data labeling system may indicate, based on the labeling model replacement request of the user, the target computing unit to replace the basic parameter data that is of the first labeling model and that is in the target model inference framework with the basic parameter data of the second labeling model, to obtain the second labeling model, and then use the second labeling model to continue to label the to-be-labeled data that has not been labeled. In this process, the user only needs to select a new labeling model, and does not need to re-upload the to-be-labeled data, so that labeling efficiency is higher.

According to a second aspect, a data labeling method is provided, where the method includes:

receiving a data labeling request sent by a client, where the data labeling request carries a model identifier of a first labeling model and hardware resource allocation information;

obtaining a target basic computing unit from a basic computing unit storage repository, where the target basic computing unit includes a target model inference framework and a hardware driver invocation tool that correspond to the first labeling model;

based on the hardware resource allocation information, allocating a hardware resource to the target basic computing unit, and establishing a target computing unit; and obtaining, from a stored correspondence between a model identifier and storage path information of basic parameter data, first storage path information that is of basic parameter data which corresponds to the model identifier of the first labeling model, and sending the first storage path information to the target computing unit, so that the target computing unit obtains basic parameter data of the to-be-used labeling model from a labeling model storage repository by using the first storage path information, combines the target model inference framework and the basic parameter data of the first labeling model, to obtain the first labeling model, obtains to-be-labeled data, inputs the to-be-labeled data into the first labeling model, and labels the to-be-labeled data, where the basic parameter data of the first labeling model includes a value obtained after a trainable parameter in the first labeling model is trained.

In a possible implementation, the method further includes:

receiving the model identifier and the basic parameter data that are of the first labeling model and that are sent by the client; and storing the basic parameter data of the first labeling model in the labeling model storage repository, and correspondingly storing the model identifier of the first labeling model and the first storage path information of the basic parameter data of the first labeling model.

In a possible implementation, the data labeling request further carries a data identifier of the to-be-labeled data, and the method further includes:

obtaining, from a stored correspondence between a data identifier and storage path information of data, second storage path information corresponding to the data identifier of the to-be-labeled data; and sending the second storage path information to the target computing unit, so that the target computing unit obtains the to-be-labeled data by using the second storage path information.

In a possible implementation, the data labeling request further carries a framework identifier of the target model inference framework, and the obtaining a target basic computing unit from a basic computing unit storage repository includes:

obtaining, from the basic computing unit storage repository based on the framework identifier of the target model inference framework, the target basic computing unit including the target model inference framework.

In a possible implementation, the method further includes:

in a process in which the target computing unit labels the to-be-labeled data by using the first labeling model, receiving a labeling model replacement request sent by the client, where the labeling model replacement request carries a model identifier of a second labeling model;

obtaining, from a stored correspondence between a model identifier and storage path information of basic parameter data, third storage path information that is of basic parameter data which corresponds to the model identifier of the second labeling model; and sending a model replacement instruction to the target computing unit, where the model replacement instruction carries the third storage path information, so that the target computing unit stops labeling to-be-labeled data that has not been labeled, obtains basic parameter data of the second labeling model from the labeling model storage repository by using the third storage path information, replaces the basic parameter data that is of the first labeling model and that is in the target model inference framework with the basic parameter data of the second labeling model, to obtain the second labeling model, inputs the to-be-labeled data that has not been labeled into the second labeling model, and labels the to-be-labeled data that has not been labeled, where the second labeling model and the first labeling model correspond to a same model inference framework.

According to a third aspect, a data labeling apparatus is provided, where the apparatus includes:

a receiving module, configured to receive a data labeling request sent by a client, where the data labeling request carries a model identifier of a first labeling model and hardware resource allocation information;

an obtaining module, configured to obtain a target basic computing unit from a basic computing unit storage repository, where the target basic computing unit includes a target model inference framework and a hardware driver invocation tool that correspond to the first labeling model;

an allocation module, configured to: based on the hardware resource allocation information, allocate a hardware resource to the target basic computing unit, and establish a target computing unit; and a sending module, configured to: obtain, from a stored correspondence between a model identifier and storage path information of basic parameter data, first storage path information that is of basic parameter data which corresponds to the model identifier of the first labeling model, and send the first storage path information to the target computing unit, so that the target computing unit obtains basic parameter data of the to-be-used labeling model from a labeling model storage repository by using the first storage path information, combines the target model inference framework and the basic parameter data of the first labeling model, to obtain the first labeling model, obtains to-be-labeled data, inputs the to-be-labeled data into the first labeling model, and labels the to-be-labeled data, where the basic parameter data of the first labeling model includes a value obtained after a trainable parameter in the first labeling model is trained.

In a possible implementation, the receiving module is further configured to:

receive the model identifier and the basic parameter data that are of the first labeling model and that are sent by the client; and store the basic parameter data of the first labeling model in the labeling model storage repository, and correspondingly store the model identifier of the first labeling model and the first storage path information of the basic parameter data of the first labeling model.

In a possible implementation, the data labeling request further carries a data identifier of the to-be-labeled data, and the obtaining module is further configured to:

obtain, from a stored correspondence between a data identifier and storage path information of data, second storage path information corresponding to the data identifier of the to-be-labeled data; and send the second storage path information to the target computing unit, so that the target computing unit obtains the to-be-labeled data by using the second storage path information.

In a possible implementation, the data labeling request further carries a framework identifier of the target model inference framework, and the obtaining module is configured to:

obtain, from the basic computing unit storage repository based on the framework identifier of the target model inference framework, the target basic computing unit including the target model inference framework.

In a possible implementation, the apparatus further includes:

a replacement module, configured to: in a process in which the target computing unit labels the to-be-labeled data by using the first labeling model, receive a labeling model replacement request sent by the client, where the labeling model replacement request carries a model identifier of a second labeling model;

obtain, from a stored correspondence between a model identifier and storage path information of basic parameter data, third storage path information that is of basic parameter data which corresponds to the model identifier of the second labeling model; and send a model replacement instruction to the target com-
puting unit, where the model replacement instruction
carries the third storage path information, so that the
target computing unit stops labeling to-be-labeled data
that has not been labeled, obtains basic parameter data
of the second labeling model from the labeling model
storage repository by using the third storage path
information, replaces the basic parameter data that is of
the first labeling model and that is in the target model
inference framework with the basic parameter data of
the second labeling model, to obtain the second label-
ing model, inputs the to-be-labeled data that has not
been labeled into the second labeling model, and labels
the to-be-labeled data that has not been labeled, where
the second labeling model and the first labeling model
correspond to a same model inference framework.

According to a fourth aspect, a data labeling manager is
provided. The data labeling manager includes a processor
and a memory, the memory stores at least one instruction,
and the instruction is loaded and executed by the processor
to implement operations performed by using the data label-
ing method according to the second aspect.

According to a fifth aspect, a computer-readable storage
medium is provided. The storage medium stores at least one
instruction, and the instruction is loaded and executed by a
processor to implement operations performed by using the
data labeling method according to the second aspect.

In the solution shown in the embodiments of this appli-
cation, when a user has a labeling requirement, the user may
send a data labeling request to a data labeling system, and a
data labeling manager in the data labeling system may
receive the data labeling request, obtain basic parameter data
of a first labeling model from a labeling model storage
repository, obtain a target basic computing unit comprising
a target model inference framework from a basic computing
unit repository, and allocate a hardware resource to the target
basic computing unit, to establish a target computing unit.
The target computing unit may combine the target model
inference framework and the basic parameter data of the first
labeling model, to obtain the first labeling model. Then, the
target computing unit may label to-be-labeled data by using
the first labeling model. In this way, a labeling model does
not need to be integrated into the data labeling system
through hard coding, and sources of basic parameter data of
the labeling model may be diverse, and is not limited to code
integration by a skilled person. Therefore, the labeling
model may be more flexible, optional labeling models are
more abundant, and a data labeling service may be better
provided for the user. In addition, the hardware resource is
specified by the user, to better meet the labeling requirement
of the user.

DESCRIPTION OF EMBODIMENTS

Figure 1:
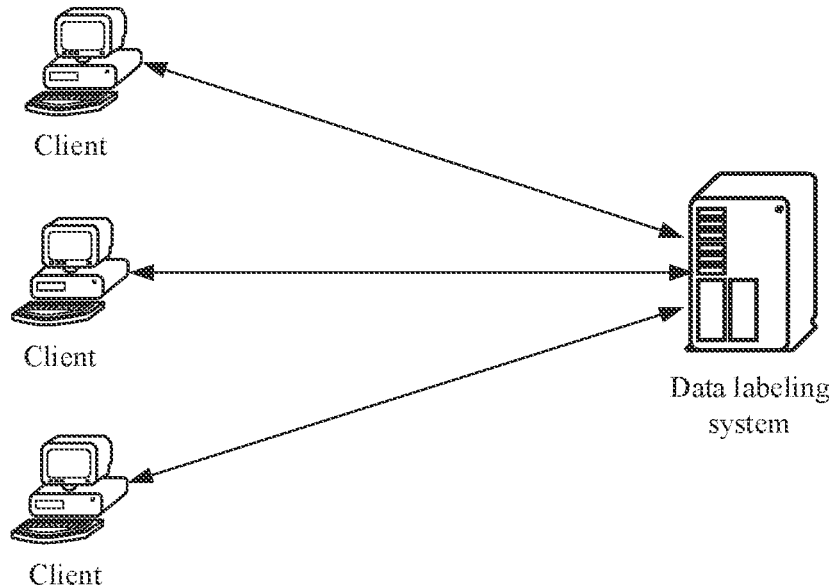
FIG. 1 is a schematic diagram of an implementation
environment according to an embodiment of this applica-
tion.

The embodiments of this application provide a data
labeling method. The method may be implemented by a data
labeling manager in a data labeling system. The data label-
ing system may be a single server or a server cluster. FIG.
1 is a schematic diagram of an implementation environment
according to an embodiment of this application. The imple-
mentation environment may include a client and a data
labeling system. A user can select a to-be-used labeling
model by using the client, upload to-be-labeled data to the
data labeling system, and send a data labeling request. The
data labeling system can obtain, through combination, the
labeling model selected by the user, and label, by using the
labeling model obtained through the combination, the to-be-
labeled data uploaded by the user. In addition, the user may
further upload basic parameter data of the labeling model to
the data labeling system by using the client, so that the data
labeling system subsequently combines the basic parameter
data uploaded by the user and a model inference framework
to obtain the labeling model, and labels the to-be-labeled
data uploaded by the user.

Figure 2:
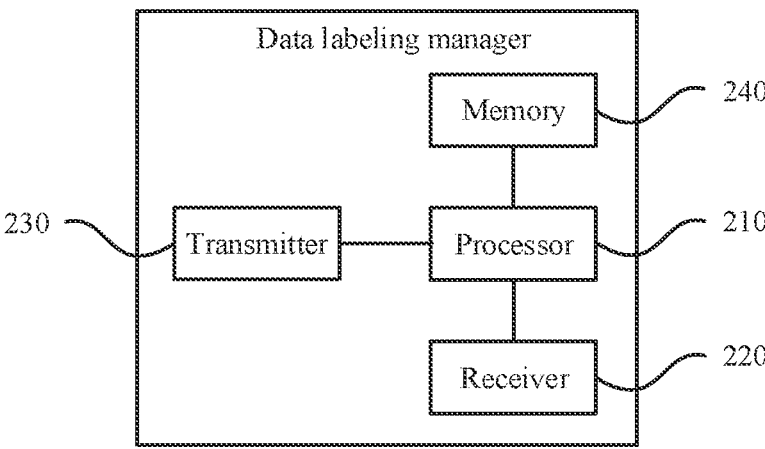
FIG. 2 is a schematic structural diagram of a data labeling
manager according to an embodiment of this application.

A schematic structural diagram of the foregoing data
labeling manager may be shown in FIG. 2. Refer to FIG. 2.
The data labeling manager may include a processor 210, a
receiver 220, and a transmitter 230. The receiver 220 and the
transmitter 230 may be connected to the processor 210. The
receiver 220 and the transmitter 230 may be network inter-
face cards. The receiver 220 may be configured to receive
the data labeling request sent by the client, and the like. The
transmitter 230 may send labeling result data to the client.
The processor 210 may be a control center of the data
labeling manager, and is connected to all parts of the entire
data labeling manager, such as the receiver 220 and the
transmitter 230, through various interfaces and lines. In this
application, the processor 210 may be a CPU (Central
Processing Unit, central processing unit). Optionally, the
processor 210 may include one or more processing units.
The processor 210 may alternatively be a digital signal
processor, an application-specific integrated circuit, a field
programmable gate array, another programmable logic
device, or the like. The data labeling manager may further
include a memory 240. The memory 240 may be configured
to store a software program and a module. The processor 210
labels the to-be-labeled data by reading software code and
the module that are stored in the memory.

Figure 3:
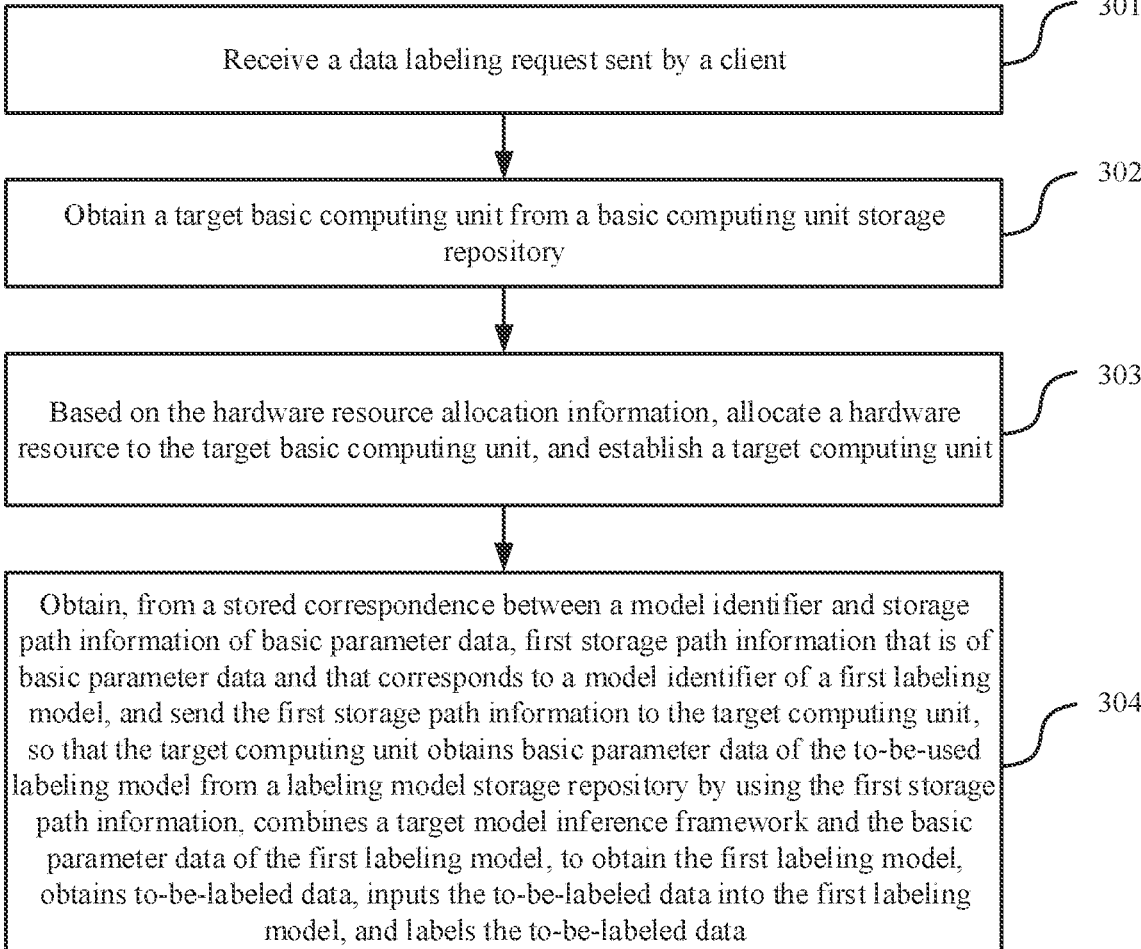
FIG. 3 is a flowchart of a data labeling method according
to an embodiment of this application.

FIG. 3 is a flowchart of a data labeling method according
to an embodiment of this application. A procedure of the
method may include the following steps.

Step 301: Receive a data labeling request sent by a client.

In an implementation, a user may log in, on the client, to
a target account that is pre-registered in a data labeling
system. After logging in to the target account of the user on
the client, the user can upload to-be-labeled data by using
the client. For example, the to-be-labeled data may be a
picture. Before uploading the to-be-labeled data to a labeling
platform, the user can pack and name the to-be-labeled data
based on data specifications of the labeling platform, and
upload the to-be-labeled data to the labeling platform. After
receiving the to-be-labeled data uploaded by the client, a
data labeling manager in the data labeling system may store the to-be-labeled data, and store a correspondence between a data identifier and storage path information of the to-be-labeled data.

After the client uploads the to-be-labeled data to the data labeling system, the data labeling system may send a to-be-labeled data list to the client. The to-be-labeled data list may include a data identifier of to-be-labeled data just uploaded by the user to the data labeling system, and may further include a data identifier of to-be-labeled data previously uploaded by the user to the data labeling system. Herein, the data identifier may be a name of the to-be-labeled data before the user uploads the to-be-labeled data. The user may select the data identifier of the to-be-labeled data that needs to be labeled from the to-be-labeled data list.

In addition, a labeling model uploading option may further be displayed on the client. The user may select the labeling model uploading option, and upload basic parameter data of a labeling model to the data labeling system by using the client. The basic parameter data of the labeling model includes a value obtained after a trainable parameter (weight) in the labeling model is trained. The basic parameter data uploaded by the user may be the basic parameter data that is of the labeling model and that is packed, named, and uploaded by the user to the data labeling system based on model specifications of the data labeling system. When uploading the basic parameter data of the labeling model, the client may upload an account identifier of the target account, a model identifier of the labeling model, and the basic parameter data of the labeling model to the data labeling system. The data labeling system may store, in a labeling model storage repository, the basic parameter data of the labeling model uploaded by the client, and correspondingly store a model identifier corresponding to the basic parameter data of the labeling model uploaded by the client, the account identifier of the target account, and storage path information of the basic parameter data.

A labeling model selection option may further be displayed on the client. After the user selects the labeling model selection option, the client is triggered to send a labeling model list obtaining request to the data labeling system. The labeling model list obtaining request may carry the account identifier of the target account to which the client currently logs in. After receiving the labeling model list obtaining request, the data labeling system may obtain a model identifier of a public labeling model and a model identifier corresponding to the account identifier of the target account, use the model identifier of the public labeling model and the model identifier corresponding to the account identifier of the target account as a labeling model list corresponding to the target account, and return the labeling model list to the client. The user may select, from the labeling model list, a model identifier of a to-be-used first labeling model.

After selecting the to-be-labeled data and the first labeling model, the user may select a labeling start option on the client, to trigger the client to send the data labeling request to the data labeling system. The data labeling request may carry the data identifier of the to-be-labeled data and the model identifier of the first labeling model. The data labeling manager in the data labeling system may receive the data labeling request.

Step 302: Obtain a target basic computing unit from a basic computing unit storage repository.

There may be a plurality of model inference frameworks, such as a convolutional architecture for fast feature embedding (convolutional architecture for fast feature embedding, Caffe), Tensorflow, and PyTorch.

In an implementation, basic parameter data of a labeling model and a corresponding model inference framework may be separately stored in the data labeling system. The basic parameter data of the labeling model may be stored in the labeling model storage repository, and the model inference framework of the labeling model may be packed in the basic computing unit, and stored in the basic computing unit storage repository. Each basic computing unit may include at least one model inference framework, and may further include a ToolKit that invokes a hardware driver, runtime that supports language running, a data labeling manager interaction module, and the like.

The target basic computing unit including a target model inference framework corresponding to the first labeling model may be obtained in a plurality of manners. Several of the manners are listed below for description.

Manner 1: The data labeling system may store correspondences between model identifiers of all labeling models available to the user and identifiers of basic computing units.

For the public labeling model, a correspondence between the model identifier of the public labeling model and an identifier of a basic computing unit may be configured by a skilled person in the data labeling system. A basic computing unit corresponding to a model identifier of a labeling model should include a model inference framework corresponding to the labeling model. For a labeling model corresponding to basic parameter data uploaded by the user, the user can specify a model inference framework corresponding to the labeling model when uploading the basic parameter data of the labeling model. In this case, the client may send, to the data labeling system, a model identifier of the labeling model corresponding to the basic parameter data uploaded by the user and a frame identifier of the model inference framework specified by the user, and the data labeling system correspondingly stores the model identifier of the labeling model corresponding to the basic parameter data uploaded by the user and an identifier of a basic computing unit including the model inference framework specified by the user.

After receiving a data labeling request, the data labeling manager may determine an identifier of a corresponding basic computing unit based on a model identifier carried in the data labeling request. If identifiers of a plurality of basic computing units are determined herein, an identifier of a target basic computing unit may be randomly selected from the identifiers.

Then, the data labeling manager may obtain the target basic computing unit from the basic computing unit storage repository.

Manner 2: A correspondence between a model identifier of a public labeling model and an identifier of a basic computing unit may be stored in the data labeling system.

After the user selects the first labeling model by using the client, if the first labeling model selected by the user is a public labeling model, the labeling start option may be selected, to trigger the client to send the data labeling request to the data labeling system. The data labeling request may carry the data identifier of the to-be-labeled data and the model identifier of the first labeling model. The data labeling manager in the data labeling system may obtain the identifier of the target basic computing unit from the correspondence between the model identifier of the public labeling model and the identifier of the basic computing unit based on the model identifier that is of the first labeling model and that is in the data labeling request, and may further obtain the target basic computing unit from the basic computing unit storage repository.

If the first labeling model selected by the user is the labeling model corresponding to the basic parameter data uploaded by the user, the client may jump to a model inference framework selection interface. A model inference framework list is displayed in the machine learning selection interface, and the model inference framework list may include frame identifiers of various model inference frameworks. The user can select a framework identifier of a target model inference framework based on an actual requirement. After selecting the target model inference framework, the user may select the labeling start option on the client, to trigger the client to send the data labeling request to the data labeling system. The data labeling request may carry the data identifier of the to-be-labeled data, the framework identifier of the target model inference framework, and the model identifier of the first labeling model. In this case, the data labeling system may store a correspondence between a frame identifier of a model inference framework and an identifier of a basic computing unit. In this case, the data labeling manager may obtain the identifier of the corresponding target model inference framework based on the framework identifier in the data labeling request, and may further obtain the target basic computing unit from the basic computing unit storage repository.

Step 303: Allocate a hardware resource to the target basic computing unit based on hardware resource allocation information, and establish a target computing unit.

In an implementation, a hardware resource allocation option may further be displayed on the client. Before selecting the labeling start option, the user may further select a hardware resource allocation option to enter a hardware resource allocation interface. In the hardware resource allocation interface, the user can input the required hardware resource allocation information based on an actual requirement. The hardware resource allocation information may include a quantity of CPUs, a quantity of graphics processing units (Graphics Processing Units, GPU), and the like. Correspondingly, the data labeling request sent by the client may further carry the hardware resource allocation information. After receiving the data labeling request, the data labeling manager may allocate the hardware resource to the target basic computing unit based on the hardware resource allocation information carried in the data labeling request, to construct the target computing unit.

Step 304: Obtain, from a stored correspondence between a model identifier and storage path information of basic parameter data, first storage path information that is of basic parameter data which corresponds to the model identifier of the first labeling model, and send the first storage path information to the target computing unit. In this way, the target computing unit obtains basic parameter data of to-be-used labeling model from the labeling model storage repository by using the first storage path information, combines the target model inference framework and the basic parameter data of the first labeling model, to obtain the first labeling model, obtains the to-be-labeled data, inputs the to-be-labeled data into the first labeling model, and labels the to-be-labeled data.

In an implementation, the data labeling manager may obtain the model identifier that is of the first labeling model and that is carried in the data labeling request, and obtain the first storage path information of the basic parameter data of the first labeling model from the stored correspondence between the model identifier and the storage path information of the basic parameter data. Then, the data labeling manager may send the first storage path information of the basic parameter data of the first labeling model to the target computing unit.

After receiving the first storage path information, the target computing unit may obtain the basic parameter data of the first labeling model from the labeling model storage repository based on the first storage path information.

In the labeling model storage repository, the basic parameter data of each labeling model can be packed with a corresponding labeling inference script and a dependency file of the labeling inference script for storage. Herein, a combination of the basic parameter data, the corresponding labeling inference script, and the dependency file of the labeling inference script may be referred to as a model basic file.

Correspondingly, when obtaining the basic parameter data of the first labeling model, the target computing unit may obtain a target model basic file including the basic parameter data of the first labeling model. A skilled person may compile and pack a model basic file of the public labeling model in the labeling model storage repository, and the user needs to compile and pack, based on model specifications of the data labeling system, a model basic file of the labeling model uploaded by the user by using the client.

The labeling inference script in the model basic file needs to provide the following interfaces: a labeling model loading interface, a to-be-labeled data preprocessing interface, a data labeling interface, and a labeling result data processing interface. The labeling model loading interface is used to load the labeling model into a memory; the to-be-labeled data preprocessing interface is used to preprocess the to-be-labeled data, such as format conversion, so that the to-be-labeled data can adapt to the labeling model; the data labeling interface is used to indicate how to label the to-be-labeled data, such as parallel labeling and serial labeling; and the labeling result data processing interface is used to perform format conversion on labeling result data output by the labeling model, to meet a format requirement of the user for the labeling result data.

Figure 4:
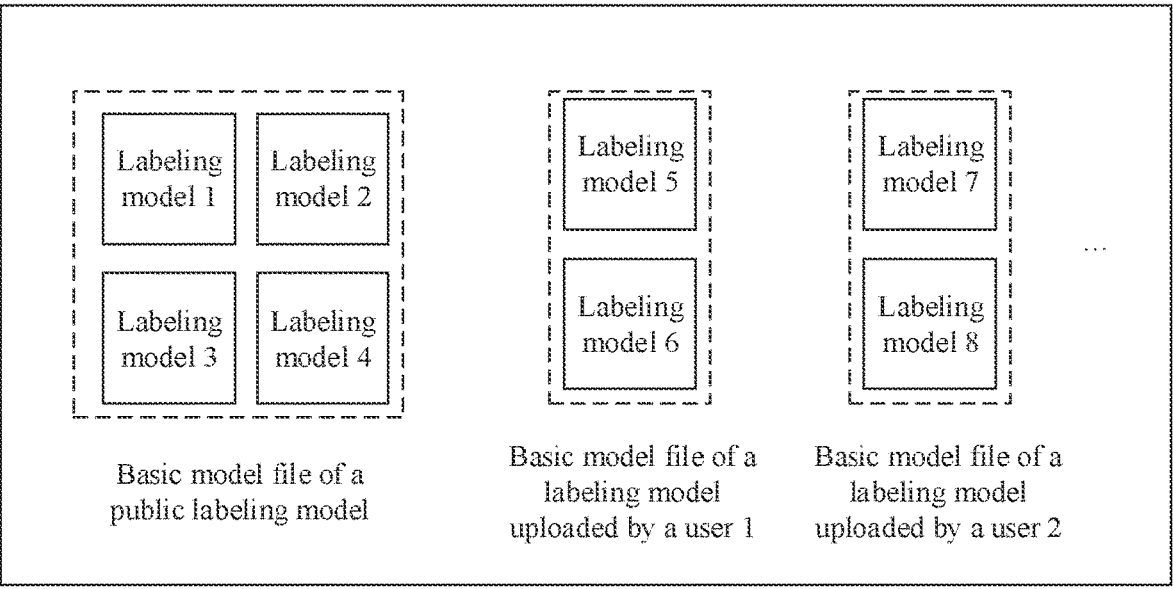
FIG. 4 is a schematic diagram of a labeling model storage
repository according to an embodiment of this application.

As shown in FIG. 4, a model basic file of a public labeling model and a model basic file of a labeling model uploaded by each user may be separately stored in the labeling model storage repository. The model basic file of the public labeling model may include basic model files of a labeling model 1, a labeling model 2, a labeling model 3, and a labeling model 4. A basic model file of a labeling model uploaded by a user 1 includes basic model files of a labeling model 5 and a labeling model 6. A basic model file of a labeling model uploaded by a user 2 includes basic model files of a labeling model 7 and a labeling model 8.

After obtaining the basic parameter data of the first labeling model, the target computing unit may add the basic parameter data to the target model inference framework, to obtain the first labeling model.

The data labeling manager may obtain the data identifier that is of the to-be-labeled data and that is carried in the data labeling request, and obtain second storage path information of the to-be-labeled data based on a stored correspondence between a data identifier and storage path information of data.

The data labeling manager may send the second storage path information of the to-be-labeled data to the target computing unit. The target computing unit may obtain the to-be-labeled data based on the second storage path information of the to-be-labeled data.

Then, the target computing unit may execute a labeling inference script of the target model basic file, invoke a labeling model loading interface in the labeling inference script, and load the first labeling model into the memory. Before the to-be-labeled data is input into the first labeling model, a to-be-labeled data preprocessing interface in the labeling inference script may be further invoked to preprocess the to-be-labeled data. Herein, the preprocessing may be format conversion processing, that is, the to-be-labeled data is converted into a format that can be labeled by using the first labeling model. Then, a data labeling interface in the labeling inference script may be invoked, and the preprocessed to-be-labeled data is input into the first labeling model. Then, after the first labeling model outputs labeling result data corresponding to each piece of to-be-labeled data, the labeling result data processing interface in the labeling inference script may be invoked to perform post-labeling processing on the labeling result data. Herein, the post-labeling processing may be format conversion processing, for example, converting output labeling result data in a JavaScript object notation (JavaScript Object Notation, Json) format into an extensible markup language (Extensible Markup Language, XML) format.

After the labeling is completed, the target computing unit may send the labeling result data to the data labeling manager, and then the data labeling manager returns the labeling result data to the client.

In a possible implementation, in a process of labeling the to-be-labeled data by using the first labeling model, the labeling model may be changed, and the changed labeling model is used to label the to-be-labeled data. Correspondingly, the processing may be as follows:

A labeling model replacement option may be displayed on the client. The user may select the labeling model replacement option to enter a labeling model selection interface. A replaceable labeling model list may be displayed in the labeling model selection interface, and a model identifier of a labeling model that corresponds to a same model inference framework as the first labeling model may be included. The user may select, from the replaceable labeling model list, a model identifier of a to-be-used second labeling model. Then, the client may send a labeling model replacement request to the data labeling system.

The data labeling manager in the data labeling system receives the labeling model replacement request, where the labeling model replacement request carries the model identifier of the second labeling model. The data labeling manager obtains, from the stored correspondence between the model identifier and the storage path information of the basic parameter data, third storage path information that is of basic parameter data which corresponds to the model identifier of the second labeling model, and sends a labeling model replacement instruction to the target computing unit, where the labeling model replacement instruction may carry the third storage path information. After receiving the labeling model replacement instruction, the target computing unit stops labeling to-be-labeled data that has not been labeled, and obtain the basic parameter data of the second labeling model from the labeling model storage repository by using the third storage path information. Certainly, a model basic file including the basic parameter data of the second labeling model may also be obtained herein. Then, the target computing unit may replace the basic parameter data that is of the first labeling model and that is in the target model inference framework with the basic parameter data of the second labeling model, to obtain the second labeling model. In addition, the target computing unit may execute the obtained labeling inference script in the model basic file including the basic parameter data of the second labeling model, and label the to-be-labeled data that has not been labeled by using the second labeling model.

In a possible implementation, to make labeling of the labeling model more accurate, after labeling the to-be-labeled data by using the first labeling model, check adjustment may be performed manually on the labeling result data, the labeling result data obtained after the check adjustment is used as output sample data, and the to-be-labeled data that is input into the first labeling model as input sample data. The first labeling model is trained by using the output sample data and the input sample data, to update a value of a trainable parameter in the basic parameter data of the first labeling model, to optimize the first labeling model.

Figure 6:
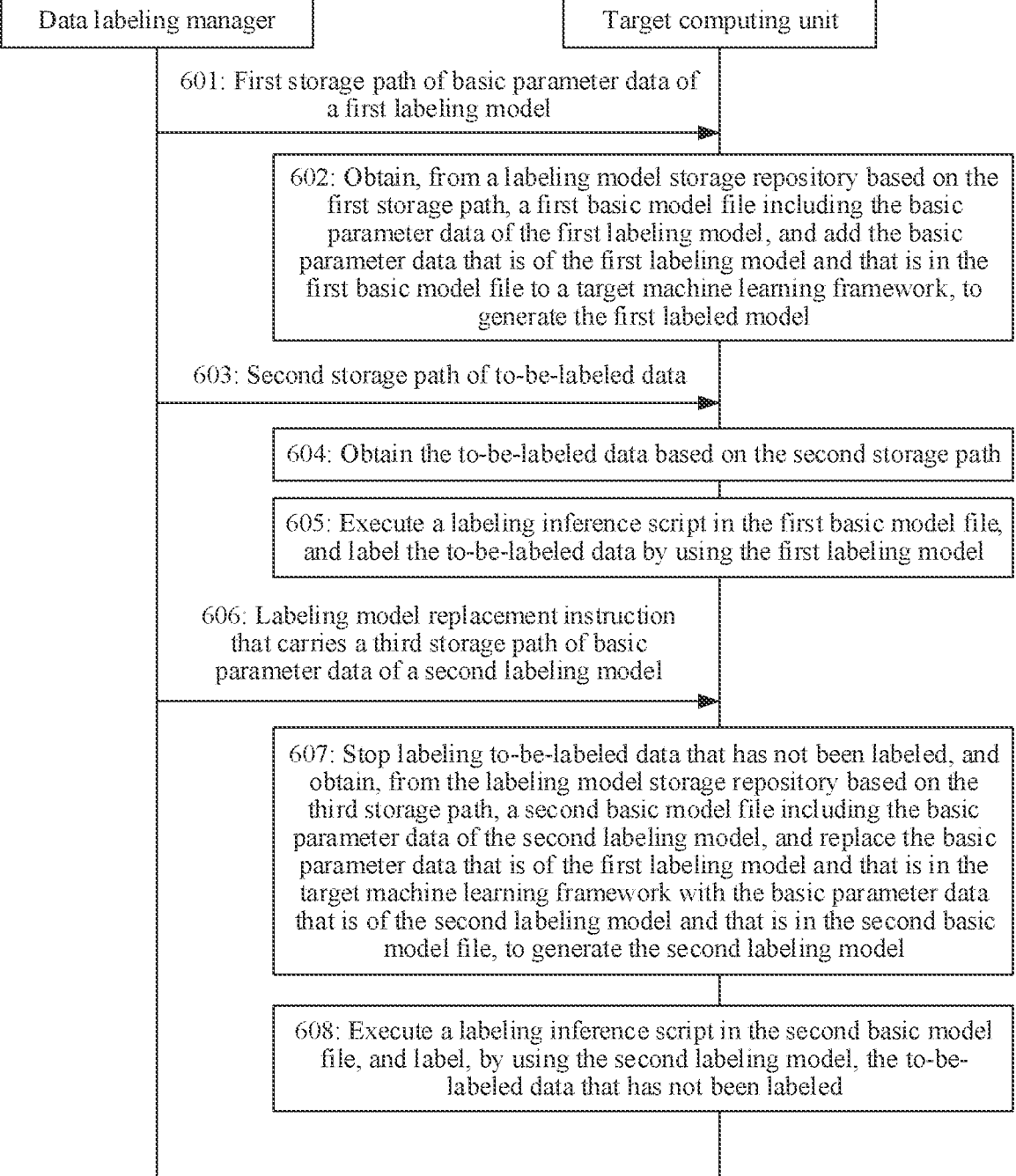
FIG. 6 is a flowchart of interaction between a data
labeling manager and a target computing unit according to
an embodiment of this application.

The following describes an interaction procedure between a data labeling manager and a target computing unit in a data labeling system with reference to FIG. 6. Refer to FIG. 6. In a labeling process, an interaction procedure between the data labeling manager and the target computing unit may include the following steps:

Step 601: The data labeling manager sends first storage path information of basic parameter data of a first labeling model to the target computing unit.

Step 602: The target computing unit obtains, from a labeling model storage repository based on the first storage path information, a first basic model file including the basic parameter data of the first labeling model, adds the basic parameter data of the first labeling model in the first basic model file to a target model inference framework, to generate the first labeling model.

Step 603: The data labeling manager sends second storage path information of to-be-labeled data to the target computing unit.

Step 604: The target computing unit obtains the to-be-labeled data based on the second storage path information.

Step 605: The target computing unit executes a labeling inference script in the first basic model file, and labels the to-be-labeled data by using the first labeling model.

Step 606: The labeling manager sends a labeling model replacement instruction to the target computing unit, where the labeling model replacement instruction carries third storage path information of basic parameter data of a second labeling model.

Step 607: The target computing unit stops labeling to-be-labeled data that has not been labeled, obtains, from the labeling model storage repository based on the third storage path information, a second basic model file including the basic parameter data of the second labeling model, and replaces the basic parameter data that is of the first labeling model and that is in the target model inference framework with the basic parameter data that is of the second labeling model and that is in the second basic model file, to generate the second labeling model.

Step 608: The target computing unit executes a labeling inference script in the second basic model file, and labels, by using the second labeling model, the to-be-labeled data that has not been labeled.

In the solution shown in the embodiments of this application, when a user has a labeling requirement, the user may send a data labeling request to a data labeling system, and a data labeling manager in the data labeling system may receive the data labeling request, obtain basic parameter data of a first labeling model from a labeling model storage repository, obtain a target basic computing unit including a target model inference framework from a basic computing unit repository, and allocate a hardware resource to the target basic computing unit, to construct a target computing unit. The target computing unit may combine the target model inference framework and the basic parameter data of the first labeling model, to obtain the first labeling model. Then, the target computing unit may label to-be-labeled data by using the first labeling model. In this way, a labeling model does not need to be integrated into the data labeling system through hard coding, and sources of basic parameter data of the labeling model may be diverse, and is not limited to code integration by a skilled person. Therefore, the labeling model may be more flexible, and optional labeling models are more abundant. In addition, the hardware resource is specified by the user, to better meet the labeling requirement of the user.

Figure 5:
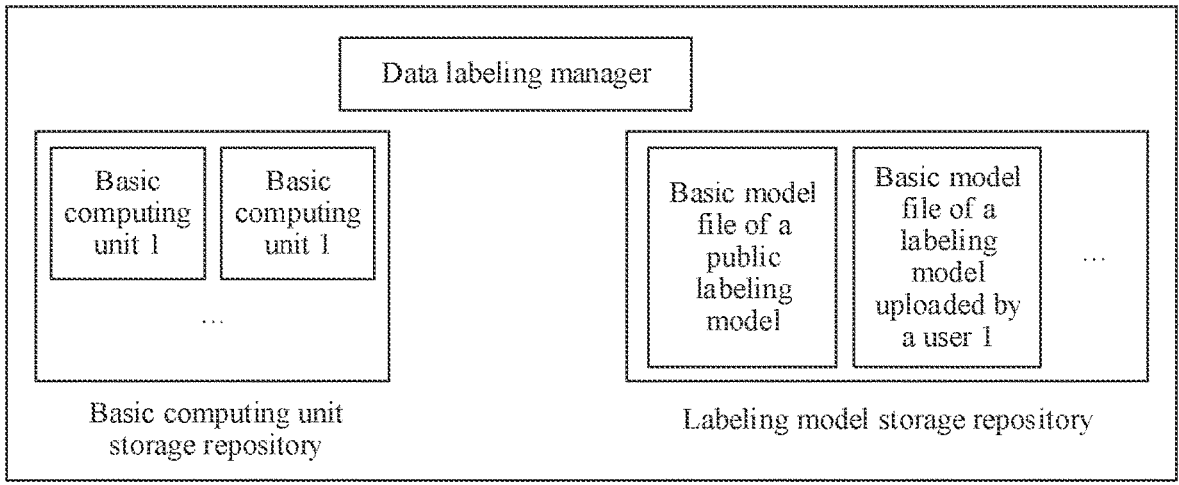
FIG. 5 is a schematic diagram of a data labeling system
according to an embodiment of this application.

An embodiment of this application further provides a data labeling system. As shown in FIG. 5, the data labeling system may include a basic computing unit storage area, a data labeling manager, and a labeling model storage repository.

The data labeling manager is configured to: receive a data labeling request sent by a client, where the data labeling request carries a model identifier of a first labeling model and hardware resource allocation information; obtain a target basic computing unit from the basic computing unit storage repository, where the target basic computing unit includes a target model inference framework and a hardware driver invocation tool that correspond to the first labeling model; based on the hardware resource allocation information, allocate a hardware resource to the target basic computing unit, and establish a target computing unit; and obtain, from a stored correspondence between a model identifier and storage path information of basic parameter data, first storage path information that is of basic parameter data which corresponds to the model identifier of the first labeling model, and send the first storage path information to the target computing unit. Specifically, the data labeling manager may implement processing performed by the data labeling manager in the steps 301 to 304 and other implicit steps, and a specific implementation of the data labeling manager is not described herein again.

The target computing unit is configured to: obtain basic parameter data of the to-be-used labeling model from the labeling model storage repository by using the first storage path information, where the basic parameter data of the first labeling model includes a value obtained after a trainable parameter in the first labeling model is trained; combine the target model inference framework and the basic parameter data of the first labeling model, to obtain the first labeling model; obtain to-be-labeled data; and input the to-be-labeled data into the first labeling model, and label the to-be-labeled data. Specifically, the target computing unit may implement processing performed by the target computing unit in step 304, and a specific implementation of the target computing unit is not described herein again.

Figure 7:
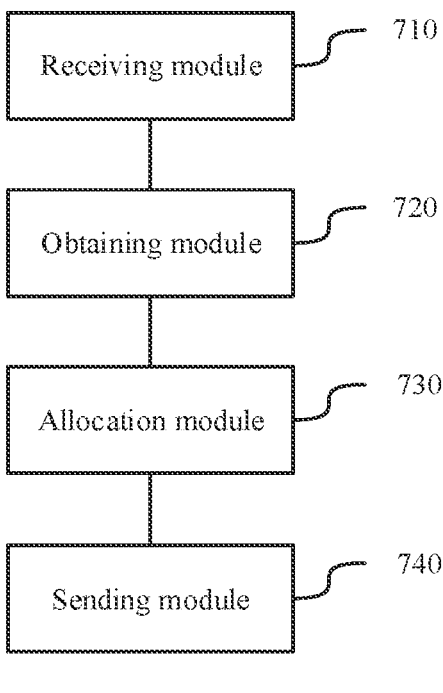
FIG. 7 is a schematic structural diagram of a data labeling
apparatus according to an embodiment of this application.

Based on a same technical concept, an embodiment of the present invention further provides a data labeling apparatus, which may be applied to implement the data labeling system described in the embodiment corresponding to FIG. 5, to implement a function of a data labeling manager. As shown in FIG. 7, the data labeling apparatus includes a receiving module 710, an obtaining module 720, an allocation module 730, and a sending module 740.

The receiving module 710 is configured to receive a data labeling request sent by a client, where the data labeling request carries a model identifier of a first labeling model and hardware resource allocation information. Specifically, a receiving function in step 301 and other implicit steps may be implemented.

The obtaining module 720 is configured to obtain a target basic computing unit from a basic computing unit storage repository, where the target basic computing unit includes a target model inference framework and a hardware driver invocation tool that correspond to the first labeling model. Specifically, an obtaining function in step 302 and other implicit steps may be implemented.

The allocation module 730 is configured to: based on the hardware resource allocation information, allocate a hardware resource to the target basic computing unit, and establish a target computing unit. Specifically, an allocation function in step 303 and other implicit steps may be implemented.

The sending module 740 is configured to: obtain, from a stored correspondence between a model identifier and storage path information of basic parameter data, first storage path information that is of basic parameter data which corresponds to the model identifier of the first labeling model, and send the first storage path information to the target computing unit, so that the target computing unit obtains basic parameter data of the to-be-used labeling model from a labeling model storage repository by using the first storage path information, combines the target model inference framework and the basic parameter data of the first labeling model, to obtain the first labeling model, obtains to-be-labeled data, inputs the to-be-labeled data into the first labeling model, and labels the to-be-labeled data, where the basic parameter data of the first labeling model includes a value obtained after a trainable parameter in the first labeling model is trained. Specifically, a sending function in step 304 and other implicit steps may be implemented.

In a possible implementation, the receiving module 710 is further configured to:

receive the model identifier and the basic parameter data that are of the first labeling model and that are sent by the client; and store the basic parameter data of the first labeling model in the labeling model storage repository, and correspondingly store the model identifier of the first labeling model and the first storage path information of the basic parameter data of the first labeling model.

In a possible implementation, the data labeling request further carries a data identifier of the to-be-labeled data, and the obtaining module 720 is further configured to:

obtain, from a stored correspondence between a data identifier and storage path information of data, second storage path information corresponding to the data identifier of the to-be-labeled data; and send the second storage path information to the target computing unit, so that the target computing unit obtains the to-be-labeled data by using the second storage path information.

In a possible implementation, the data labeling request further carries a framework identifier of the target model inference framework, and the obtaining module 720 is configured to:

obtain, from the basic computing unit storage repository based on the framework identifier of the target model inference framework, the target basic computing unit including the target model inference framework.

In a possible implementation, the apparatus further includes:

a replacement module, configured to: in a process in which the target computing unit labels the to-be-labeled data by using the first labeling model, receive a labeling model replacement request sent by the client, where the labeling model replacement request carries a model identifier of a second labeling model;

obtain, from a stored correspondence between a model identifier and storage path information of basic parameter data, third storage path information that is of basic parameter data which corresponds to the model identifier of the second labeling model, and send a model replacement instruction to the target computing unit, where the model replacement instruction carries the third storage path information, so that the target computing unit stops labeling to-be-labeled data that has not been labeled, obtains basic parameter data of the second labeling model from the labeling model storage repository by using the third storage path information, replaces the basic parameter data that is of the first labeling model and that is in the target model inference framework with the basic parameter data of the second labeling model, to obtain the second labeling model, inputs the to-be-labeled data that has not been labeled into the second labeling model, and labels the to-be-labeled data that has not been labeled, where the second labeling model and the first labeling model correspond to a same model inference framework.

It should be noted that when the data labeling apparatus according to the foregoing embodiment labels data, division of the foregoing functional modules is merely an example. In actual implementation, the foregoing functions can be allocated to different modules and implemented as necessary. In other words, an inner structure of the data labeling manager is divided into different functional modules to implement all or a part of the functions described above. In addition, the data labeling apparatus provided in the foregoing embodiment and the data labeling method embodiments belong to a same concept. For a specific implementation process, refer to the method embodiments. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a device, the procedures or functions in the embodiments of the present invention are all or partially generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, for example, a server or a data center, integrating one or more usable media. The usable medium may be a magnetic medium (for example, a floppy disk, a hard disk drive, a magnetic tape, or the like), an optical medium (for example, a digital video disk (Digital Video Disk, DVD) or the like), a semiconductor medium (for example, a solid-state drive or the like).

A person of ordinary skill in the art may understand that all or a part of the steps of the foregoing embodiments may be implemented by hardware or a program instructing related hardware. The program may be stored in a computer-readable storage medium. The storage medium mentioned above may be a read-only memory, a magnetic disk, an optical disc, or the like.

The foregoing description is merely an embodiment of this application, but is not intended to limit this application. Any modification, equivalent replacement, or improvement made without departing from the spirit and principle of this application shall fall within the protection scope of this application.

What is claimed is:

1. A data labeling system comprising at least one processor and at least one memory coupled to the at least one processor, wherein the at least one memory stores programming instructions for execution by the at least one processor to:

receive a data labeling request from a client, wherein:
the data labeling request comprises a first model identifier of a first labeling model and hardware resource allocation information, and the hardware resource allocation information comprises at least one of a quantity of central processing units (CPUs) or a quantity of graphics processing units (GPUs);

obtain, from a basic computing unit storage repository, a target basic computing unit stored in the basic computing unit storage repository, wherein:

the target basic computing unit is one of a plurality of basic computing units stored in the basic computing unit storage repository, the target basic computing unit comprises a target model inference framework corresponding to the first labeling model, the target basic computing unit is established as a target computing unit based on an allocation of hardware resources to the target basic computing unit, and the hardware resources of the target computing unit are based on the hardware resource allocation information;

send first storage path information to the target computing unit;

store a correspondence between a first model identifier and the first storage path information, wherein:

the first storage path information indicates a storage path of first basic parameter data of the first labeling model, the first basic parameter data comprises a trained value of a trainable parameter of the first labeling model, and the trained value results from training the first labeling model;

obtain, from a labeling model storage repository and using the target computing unit, the first basic parameter data of the first labeling model stored in the labeling model storage repository based on the first storage path information, wherein the first labeling model is based on the target model inference framework and the first basic parameter data;

receive to-be-labeled data; and input the to-be-labeled data into the first labeling model to label the to-be-labeled data.

2. The data labeling system according to claim 1, wherein the programming instructions are for execution by the at least one processor further to:

receive the first model identifier and the first basic parameter data from the client;

store the first basic parameter data in the labeling model storage repository; and correspondingly store the first model identifier and the first storage path information.

3. The data labeling system according to claim 1, wherein:

the data labeling request further comprises a first data identifier of the to-be-labeled data, second storage path information corresponds to the first data identifier of the to-be-labeled data, and the to-be-labeled data is based on the second storage path information.

4. The data labeling system according to claim 1, wherein the data labeling request further comprises a framework identifier of the target model inference framework; and the programming instructions are for execution by the at least one processor to:

obtain, from the basic computing unit storage repository based on the framework identifier of the target model inference framework, the target basic computing unit comprising the target model inference framework.

5. The data labeling system according to claim 1, wherein the target basic computing unit corresponds to the first model identifier.

6. The data labeling system according to claim 1, wherein the programming instructions are for execution by the at least one processor further to:

receive, in a process in which the to-be-labeled data is labeled by using the first labeling model, a labeling model replacement request from the client, wherein:

the labeling model replacement request comprises a second model identifier of a second labeling model, third storage path information corresponds to the second model identifier, the third storage path information indicates a storage path of second basic parameter data of the second labeling model, and the second basic parameter data of the second labeling model is based on the third storage path information;

replace the first basic parameter data with the second basic parameter data in the target model inference framework, to obtain the second labeling model; and input data that has not been labeled in the to-be-labeled data into the second labeling model to label the data that has not been labeled.

7. A method comprising:

receiving a data labeling request from a client, wherein:

the data labeling request comprises a first model identifier of a first labeling model and hardware resource allocation information, and the hardware resource allocation information comprises at least one of a quantity of central processing units (CPUs) or a quantity of graphics processing units (GPUs), and a target model inference framework corresponds to the first labeling model;

storing a correspondence between the first model identifier and first storage path information, wherein:

a target basic computing unit comprises the target model inference framework, the target basic computing unit is one of a plurality of basic computing units stored in a basic computing unit storage repository, the target basic computing unit is established as a target computing unit based on an allocation of hardware resources to the target basic computing unit, and the hardware resources of the target computing unit are based on the hardware resource allocation information, the first storage path information indicates a storage path of first basic parameter data of the first labeling model, the first basic parameter data comprises a trained value of a trainable parameter of the first labeling model, and the trained value results from training the first labeling model; and sending the first storage path information to the target computing unit, wherein:

the first storage path information is associated with the first basic parameter data, and the target model inference framework and the first basic parameter data are associated with the first labeling model.

8. The method according to claim 7, wherein the first basic parameter data is stored in a labeling model storage repository, and the target model inference framework is stored in the basic computing unit storage repository.

9. The method according to claim 8, further comprising:

obtaining the target basic computing unit from the basic computing unit storage repository.

10. The method according to claim 9, wherein;

the data labeling request further comprises a framework identifier of the target model inference framework, and the target basic computing unit comprising the target model inference framework is based on the framework identifier of the target model inference framework.

11. The method according to claim 9, wherein the obtaining the target basic computing unit from the basic computing unit storage repository comprises:

obtaining, based on a stored correspondence between a model identifier and a basic computing unit, the target basic computing unit corresponding to the first model identifier.

12. The method according to claim 7, wherein the method further comprises:

receiving the first model identifier and the first basic parameter data from the client;

storing the first basic parameter data in a labeling model storage repository; and correspondingly storing the first model identifier and the first storage path information.

13. The method according to claim 7, wherein the data labeling request further comprises a first data identifier of the to-be-labeled data; and the method further comprises:

sending second storage path information, wherein:

the second storage path information is associated with the to-be-labeled data, and the second storage path information corresponds to the first data identifier of the to-be-labeled data.

14. The method according to claim 7, wherein the method further comprises:

receiving a labeling model replacement request from the client, wherein the labeling model replacement request comprises a second model identifier of a second labeling model, wherein:

third storage path information corresponds to the second model identifier, and the third storage path information indicates a storage path of second basic parameter data of the second labeling model; and sending a model replacement instruction, wherein:

the model replacement instruction comprises the third storage path information, and the second basic parameter data of the second labeling model replaces the first basic parameter data in the target model inference framework to obtain the second labeling model.

15. The method according to claim 7, wherein the first basic parameter data is a basic parameter data of a public labeling model, or the first basic parameter data is a basic parameter data of an uploaded labeling model.

16. The method according to claim 7, wherein the trainable parameter comprises one or more parameters of weight.

17. An apparatus, comprising at least one processor and at least one memory coupled to the at least one processor, wherein the at least one memory stores programming instructions for execution by the at least one processor to:
   receive a data labeling request from a client, wherein:
      the data labeling request comprises a first model identifier of a first labeling model and hardware resource allocation information,
      the hardware resource allocation information comprises at least one of a quantity of central processing units (CPUs) or a quantity of graphics processing units (GPUs),
      a target model inference framework corresponds to the first labeling model,
      a target basic computing unit is one of a plurality of basic computing units stored in a basic computing unit storage repository,
      the target basic computing unit comprises the target model inference framework,
      the target basic computing unit is established as a target computing unit based on an allocation of hardware resources to the target basic computing unit, and
      the hardware resources of the target computing unit are based on the hardware resource allocation information;
   store a correspondence between a first model identifier and first storage path information, wherein:
      the first storage path information corresponds to the first model identifier of the first labeling model,
      the first storage path information indicates a storage path of first basic parameter data of the first labeling model,
      the first basic parameter data comprises a trained value of a trainable parameter of the first labeling model, and
      the trained value results from training the first labeling model; and
   send the first storage path information to the target computing unit, wherein:
      the first storage path information is associated with the first basic parameter data, and
      the target model inference framework and the first basic parameter data are associated with the first labeling model.

18. The apparatus according to claim 17, wherein the first basic parameter data is stored in a labeling model storage repository, and the target model inference framework is stored in the basic computing unit storage repository.

19. The apparatus according to claim 18, wherein the programming instructions are for execution by the at least one processor to:
   obtain the target basic computing unit from the basic computing unit storage repository.

20. The apparatus according to claim 19, wherein the programming instructions are for execution by the at least one processor to:
   obtain, based on a framework identifier of the target model inference framework, the target basic computing unit comprising the target model inference framework from the basic computing unit storage repository.

21. The apparatus according to claim 19, wherein the target basic computing unit corresponds to the first model identifier.

22. The apparatus according to claim 18, wherein the programming instructions are for execution by the at least one processor to:
   send second storage path information, wherein:
      the second storage path information is associated with the to-be-labeled data, and
      the second storage path information corresponds to the first data identifier of the to-be-labeled data.

23. The apparatus according to claim 18, wherein the programming instructions are for execution by the at least one processor to:
   receive a labeling model replacement request from a client, wherein:
      the labeling model replacement request comprises a second model identifier of a second labeling model,
      third storage path information corresponds to the second model identifier, and
      the third storage path information indicates a storage path of second basic parameter data of the second labeling model; and
   send a model replacement instruction, wherein;
      the model replacement instruction comprises the third storage path information,
      the third storage path information is associated with second basic parameter data of the second labeling model, and
      the second basic parameter data of the second labeling model replaces the first basic parameter data in the target model inference framework to obtain the second labeling model.

24. The apparatus according to claim 17, wherein the programming instructions are for execution by the at least one processor to:
   receive the first model identifier and the first basic parameter data from a client;
   store the first basic parameter data in a labeling model storage repository; and
   correspondingly store the first model identifier and the first storage path information.

* * * * *